(12) United States Patent
Ikeuchi et al.

(10) Patent No.: US 8,803,907 B2
(45) Date of Patent: Aug. 12, 2014

(54) MAP INFORMATION PROCESSOR AND DATA STRUCTURE OF MAP INFORMATION

(75) Inventors: Tomoya Ikeuchi, Tokyo (JP); Makoto Mikuriya, Tokyo (JP); Tomohiro Nakae, Tokyo (JP); Masaharu Umezu, Tokyo (JP); Yasushi Kodaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1143 days.

(21) Appl. No.: 12/678,113

(22) PCT Filed: Jul. 2, 2008

(86) PCT No.: PCT/JP2008/001741
§ 371 (c)(1),
(2), (4) Date: Mar. 12, 2010

(87) PCT Pub. No.: WO2009/069241
PCT Pub. Date: Jun. 4, 2009

(65) Prior Publication Data
US 2011/0175931 A1 Jul. 21, 2011

(30) Foreign Application Priority Data
Nov. 27, 2007 (JP) ................. 2007-305978

(51) Int. Cl.
*G09G 5/00* (2006.01)
*G08G 1/0969* (2006.01)
*G01C 21/32* (2006.01)
*G06T 17/05* (2011.01)
*G01C 21/36* (2006.01)
*G09B 29/10* (2006.01)
*G09G 5/14* (2006.01)
*G09G 5/36* (2006.01)

(52) U.S. Cl.
CPC .............. *G06T 17/05* (2013.01); *G08G 1/0969* (2013.01); *G01C 21/32* (2013.01); *G09G 5/14* (2013.01); *G09G 5/363* (2013.01); *G01C 21/3667* (2013.01); *G09G 2340/12* (2013.01); *G09G 2380/00* (2013.01); *G09B 29/106* (2013.01)
USPC ........................... 345/619; 345/637; 345/634

(58) Field of Classification Search
USPC ........... 345/418, 634, 637; 707/609; 701/532, 701/425
See application file for complete search history.

(56) References Cited

U.S. PATENT DOCUMENTS 5,968,109 A 10/1999 Israni et al.
2004/0151388 A1* 8/2004 Maeda .......................... 382/232
(Continued)

FOREIGN PATENT DOCUMENTS

DE 697 25 677 T2 8/2004
JP 62-501650 A 7/1987
(Continued)

*Primary Examiner* — Kee M Tung
*Assistant Examiner* — Nicole Gillespie
(74) *Attorney, Agent, or Firm* — Birch, Stewart, Kolasch & Birch, LLP

(57) ABSTRACT

A map information processor includes a map information storage unit 13 for storing map display information including a set of pieces of mesh-by-mesh map information managed on a mesh-by-mesh basis and including road information, background information, and in-mesh image information, an image processing unit 15 for generating a map image on a basis of image data included in the road information, the background information, and the in-mesh image information included in the mesh-by-mesh map information read from the map information storage unit, and a display device 5 for displaying the map image generated by the image processing unit.

19 Claims, 11 Drawing Sheets

(56) References Cited

U.S. PATENT DOCUMENTS

| | | |
|---|---|---|
| 2006/0106534 A1* | 5/2006 | Kawamata et al. ............ 701/208 |
| 2007/0195094 A1 | 8/2007 | Adachi |
| 2009/0140888 A1* | 6/2009 | Tsutsui ....................... 340/995.1 |
| 2009/0150062 A1* | 6/2009 | Han ............................. 701/201 |
| 2010/0017108 A1* | 1/2010 | Nakamura et al. ............ 701/200 |

FOREIGN PATENT DOCUMENTS

| | | |
|---|---|---|
| JP | 11-161161 | 6/1999 |
| JP | 2004-226214 A | 8/2004 |
| JP | 2005-214783 A | 8/2005 |
| JP | 2006-126402 A | 5/2006 |
| JP | 2007-121525 A | 5/2007 |
| WO | WO-86/02764 A1 | 5/1986 |
| WO | WO-2005/088584 A1 | 9/2005 |

\* cited by examiner

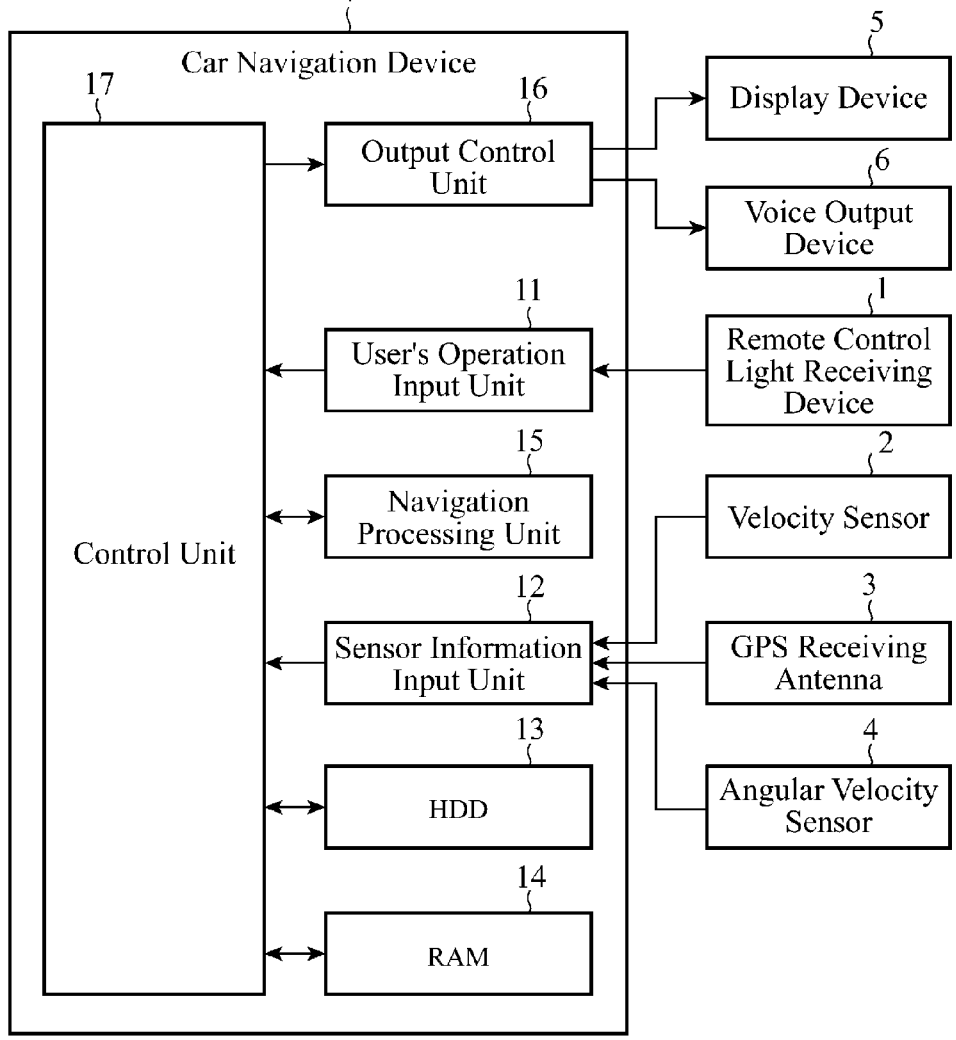
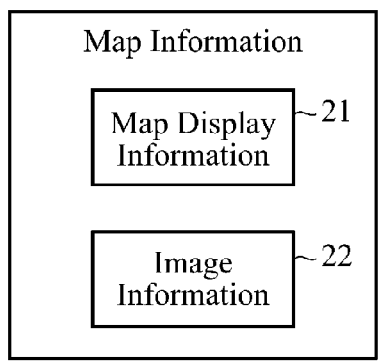

Display Area of Display Device

FIG.11

| Priority | Graphical Scale | | | | | |
|---|---|---|---|---|---|---|
| | 50m | 100m | 200m | 500m | 1km | ... |
| 1 | Without Restrictions | Without Restrictions | Without Restrictions | Without Restrictions | Without Restrictions | ... |
| 2 | Without Restrictions | Without Restrictions | Without Restrictions | Less Than 5km | Less Than 10km | ... |
| 3 | Without Restrictions | Without Restrictions | Less Than 2km | Less Than 2km | Non-Display | ... |
| 4 | Without Restrictions | Less Than 1km | Less Than 1km | Non-Display | Non-Display | ... |

FIG.12

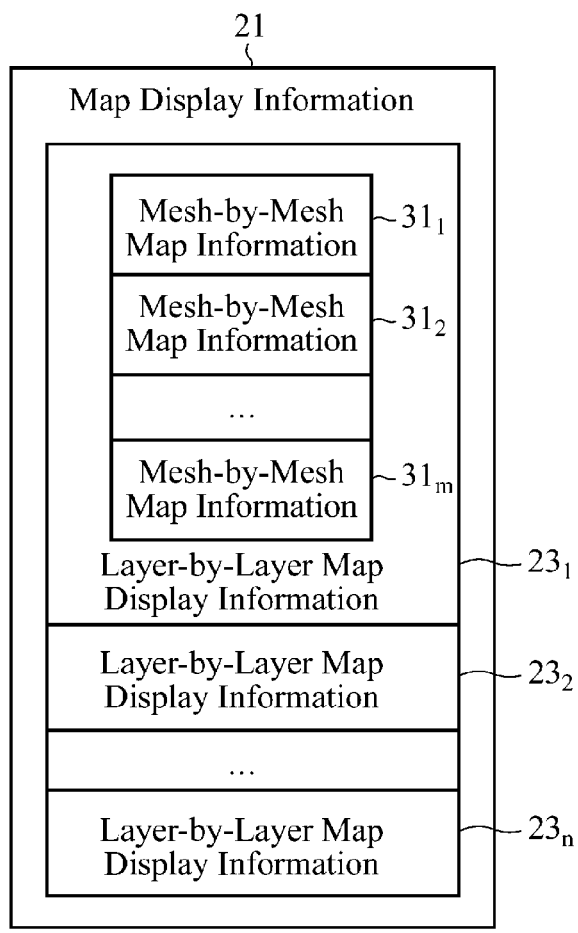

FIG.15
(a)
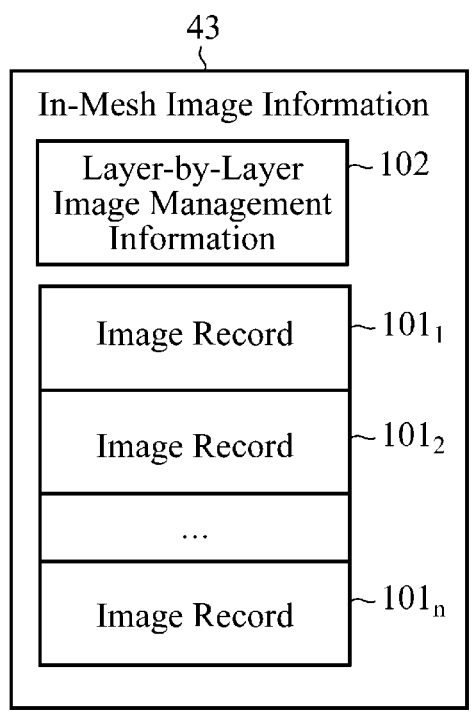
(b)
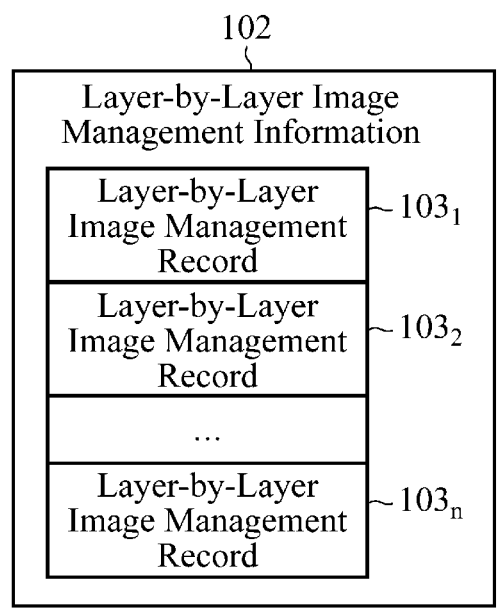
(c)
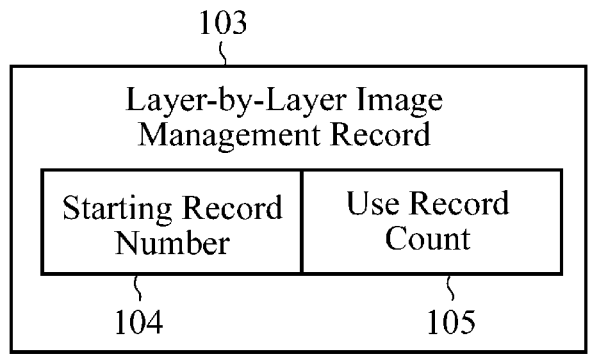

MAP INFORMATION PROCESSOR AND DATA STRUCTURE OF MAP INFORMATION

FIELD OF THE INVENTION

The present invention relates to a map information processor that processes map information in, for example, a car navigation device, and the data structure of map information for use in this map information processor.

BACKGROUND OF THE INVENTION

In a conventional map information processor, image data showing a landmark to be displayed on a map such as a facility is managed in the outside of meshes independently from data managed on a mesh-by-mesh basis (for example, refer to patent reference 1).

It takes much time to perform a map image generating process when referring to required image data every time when generating a map image from such image data managed in the outside of meshes, and the performance of the map information processor therefore degrades. To solve this problem, the conventional map information processor shortens the time required to perform the map image generating process by reading image data managed in the outside of meshes into a RAM in advance.
[Patent reference 1] JP,2005-214783,A However, in a case of handling image data having a data amount exceeding the capacity of the RAM disposed in the map information processor, a situation in which the map information processor cannot read all the image data into the RAM occurs. Therefore, there is a demand to implement map image generation in a short time also in such a situation.

The present invention is made in order to meet the above-mentioned request, and it is therefore an object of the present invention to provide a map information processor that can shorten the time required to perform a map image generating process.

DISCLOSURE OF THE INVENTION

In order to solve the above-mentioned problems, a map information processor in accordance with the present invention includes: a map information storage unit for storing map display information including a set of pieces of mesh-by-mesh map information managed on a mesh-by-mesh basis and including road information, background information, and in-mesh image information; an image processing unit for generating a map image on a basis of image data included in the road information, the background information, and the in-mesh image information included in the mesh-by-mesh map information read from the map information storage unit; and a display unit for displaying the map image generated by the image processing unit.

Because the map information processor in accordance with the present invention can generate a map image on the basis of only image data included in in-mesh image information managed on a mesh-by-mesh basis, the map information processor in accordance with the present invention does not have to read image data managed in the outside of meshes. Therefore, the map information processor in accordance with the present invention can shorten the time required to perform a map image generating process.

BRIEF DESCRIPTION OF THE FIGURES

FIG. 1 is a block diagram showing the structure of a car navigation system to which a map information processor according to Embodiment 1 of the present invention is applied;

FIG. 2 is a view showing the data structure of map information for use in the map information processor in accordance with Embodiment 1 of the present invention;

FIG. 11 is a view showing the configuration of a priority determination table for use in the map information processor in accordance with Embodiment 2 of the present invention;

FIG. 12 is a view showing the configuration of map display information of map information for use in the map information processor in accordance with Embodiment 3 of the present invention;

FIG. 15 is a view showing the detailed data structure of in-mesh image information for use in a map information processor in accordance with a variant of Embodiment 3 of the present invention.

PREFERRED EMBODIMENTS OF THE INVENTION

Figure 3:
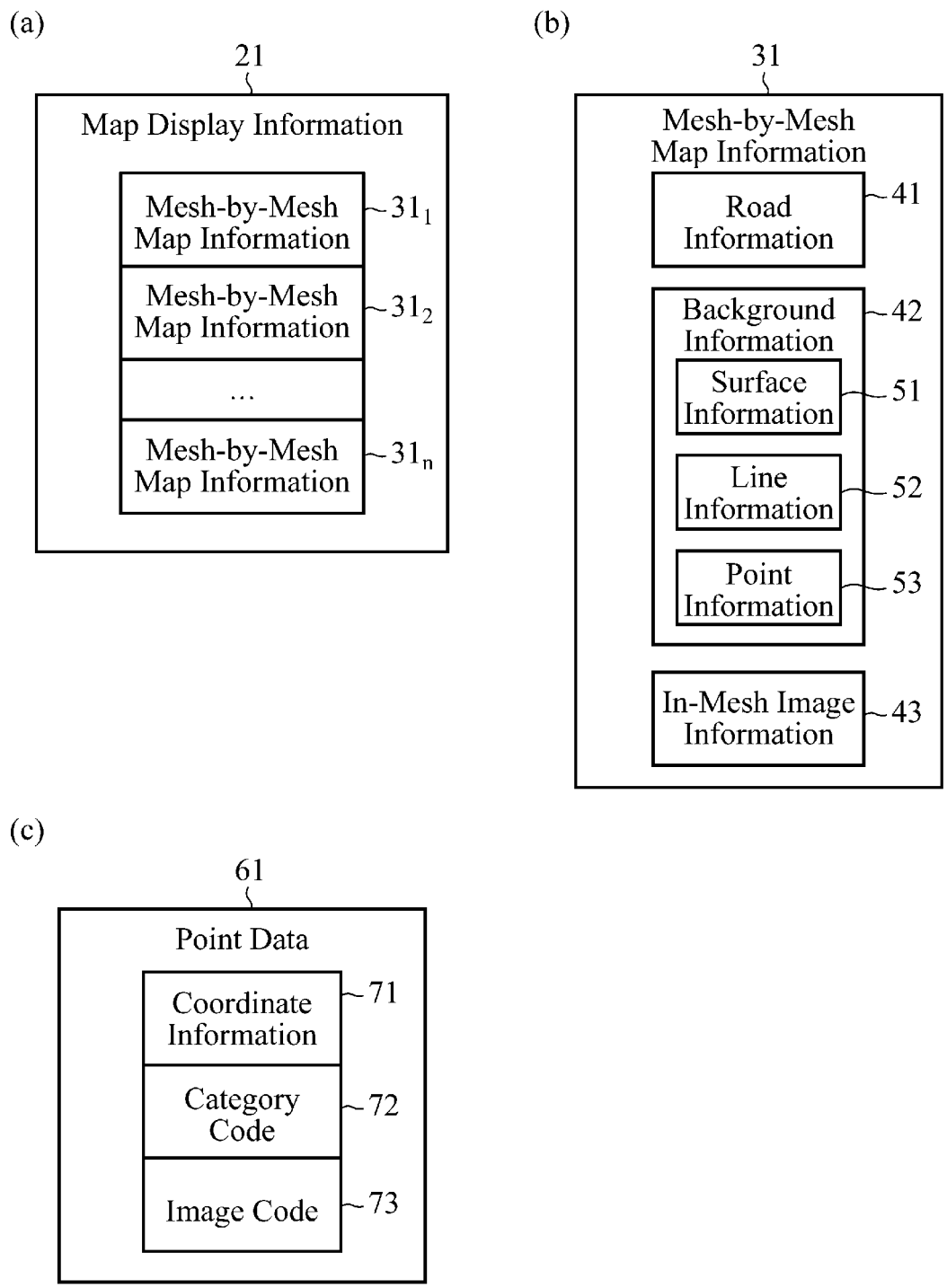
FIG. 3 is a view showing the detailed data structure of map display information shown in FIG. 2.

Hereafter, a preferred embodiment of the present invention will be described with reference to the accompanying drawings.

Embodiment 1

FIG. 1 is a block diagram showing the configuration of a car navigation system to which a map information processor in accordance with Embodiment 1 of the present invention is applied. This navigation system is provided with a remote controller (abbreviated as a "remote control" from here on) light receiving device 1, a velocity sensor 2, a GPS (Global Positioning System) receiving antenna 3, an angular velocity sensor 4, a display device 5, a voice output device 6, and a car navigation device 7.

The remote control light receiving device 1 receives a signal (an infrared ray or a radio wave) for commanding an operation which is sent thereto from a wireless remote control (not shown) operated by a user, and sends an operation signal, as the signal, to the car navigation device 7.

The velocity sensor 2 measures the velocity at which the car navigation system itself is travelling, and sends a velocity signal, as the velocity, to the car navigation device 7. The GPS receiving antenna 3 receives radio waves transmitted from GPS satellites, and sends GPS signals, as the radio waves, to the car navigation device 7. The angular velocity sensor 4 measures a change in the direction of the car navigation system itself, and sends a direction signal, as the change, to the car navigation device 7.

The display device 5 consists of, for example, a liquid crystal display, and displays information including a map image or an optimal route according to an image signal sent thereto from the car navigation device 7. The voice output device 6 consists of, for example, a speaker, and outputs a voice to provide guidance to a destination along the optimal route according to a voice signal sent thereto from the car navigation device 7. The voice output device 6 outputs, via voice, information included in map information.

The car navigation device 7 is provided with a user's operation input unit 11, a sensor information input unit 12, an HDD (Hard Disk Drive) 13, a RAM (Random Access Memory) 14, a navigation processing unit 15, an output control unit 16, and a control unit 17.

The user's operation input unit 11 receives the operation signal sent thereto from the remote control light receiving device 1, and sends the operation signal to the control unit 17. The sensor information input unit 12 receives the vehicle velocity signal sent thereto from the velocity sensor 2, the GPS signals sent thereto from the GPS receiving antenna 3, and the direction signal sent thereto from the angular velocity sensor 4, and sends sensor information, as these signals, to the control unit 17. The control unit 17 detects the position of the car navigation system itself on the basis of these vehicle velocity signal, GPS signals, and direction signal.

The HDD 13 corresponds to a map information storage unit according to the present invention, and stores map information. The details of the map information will be mentioned below. This map information stored in the HDD13 is read by the control unit 17. The map information storage unit according to the present invention is not limited to the HDD. For example, a recording medium, such as a DVD (Digital Versatile Disk) or CD (Compact Disc), and a drive for driving this recording medium can be used as the map information storage unit.

The RAM 14 stores temporarily data used for various processes. For example, map information read from the HDD 13 is written in the RAM 14 via the control unit 17. The map information stored in the RAM 14 is read by the navigation processing unit 15 via the control unit 17.

The navigation processing unit 15 performs various processes for implementing navigation functions according to a command from the control unit 17. For example, the navigation processing unit 15 detects the current position on the basis of the sensor information from the sensor information input unit 12, and also refers to the map information stored in the HDD 13 to carry out processes for implementing a current position positioning function of determining the position on a road where the current position exists, a map display function of generating a map image, which is to be displayed on the display device 5, of either an area in the vicinity of the current position or an arbitrary point, a route determining function of determining either an optimal route from the current position to an arbitrary point or an optimal route between arbitrary points, a route guiding function of providing guidance such as a right turn or a left turn while the vehicle equipped with the car navigation system travels to the destination along the optimal route determined with the route determining function, and so on. The navigation processing unit implements each of these functions with reference to the map information stored in the HDD 13. The process results obtained by this navigation processing unit 15 are sent to the control unit 17. A image processing unit according to the present invention is implemented by the navigation processing unit 15.

The output control unit 16 generates an image signal on the basis of the results of the navigation processing sent thereto, via the control unit 17, from the navigation processing unit 15 and sends the image signal to the display device 5, and also generates a voice signal and sends the voice signal to the voice output device 6.

The control unit 17 controls the whole car navigation device 7 by controlling the user's operation input unit 11, the sensor information input unit 12, the HDD 13, the RAM 14, the navigation processing unit 15, and the output control unit 16.

Next, the details of the map information stored in the HDD 13 will be explained. FIG. 2 shows the data structure of the map information. The map information is comprised of map display information 21 and image information 22. The map display information 21 is comprised of a set of pieces of mesh-by-mesh map information $31_1, 31_2, \square \ldots,$ and $31_m$ (m is a positive integer) which are managed on a mesh-by-mesh basis, i.e., which are managed respectively in grid-shaped meshes into which a whole area for which map display is supported is divided, as shown in FIG. 3(*a*). Each of the pieces of mesh-by-mesh map information $31_1, 31_2, \square \ldots,$ and $31_m$ (each mesh-by-mesh map information is representedly designated by a numeral reference "31" from here on) is comprised of road information 41, background information 42, and in-mesh image information 43, as shown in FIG. 3(*b*).

The road information 41 is comprised of a set of pieces of link information (including coordinate information) each corresponding to a road. The background information 42 is comprised of surface information 51, line information 52 and point information 53. The surface information 51 is the one for drawing surfaces, such as woods and lakes, and are comprised of a set of surface data each corresponding to an individual surface. Each surface data holds coordinate information about a surface. The line information 52 is the one for drawing lines, such as rivers and administrative boundary lines, and is comprised of a set of line data each corresponding to an individual line. Each line data holds coordinate information about a line. The point information 53 is the one for drawing symbols and images, such as facility mark images and map symbols, and is comprised of a set of point data 61 each corresponding to an individual symbol or image, or the like.

As shown in FIG. 3(*c*), each point data 61 holds coordinate information 71 showing a position at which an individual symbol, a facility mark image or the like is drawn, a category code 72 which is an identifier for acquiring image data to be displayed on a map screen from the image information 22, and an image code 73 which is an identifier for acquiring image data to be displayed on the map screen from the in-mesh image information 43.

Figure 4:
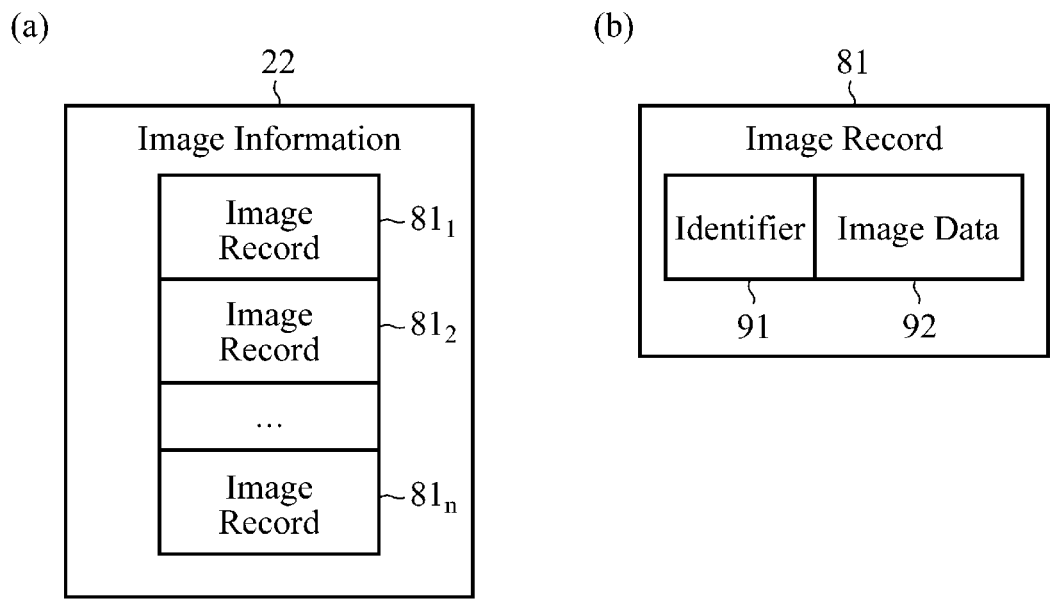
FIG. 4 is a view showing the detailed data structure of the image information shown in FIG. 2.

FIG. 4 shows the data structure of the image information 22. The image information 22 is the one which is not managed on a mesh-by-mesh basis, i.e. map information managed in the outside of the meshes. As shown in FIG. 4(*a*), the image information 22 is comprised of a set of image records $81_1,$ $81_2, \ldots,$ and $81_n$. Each of the image records $81_1, 81_2, \ldots,$ and $81_n$ (each image record is representedly designated by a numeral reference "81" from here on) holds an identifier 91 for specifying image data uniquely and the image data 92, as shown in FIG. 4(b). The image data 92 can be formed using a general format, e.g. a bitmap format. Each image data 92 stored in the image information 22 is the one frequently used in the map display function, e.g. the one used in a case of producing a map display of an image of either a facility mark according to the type of a facility (e.g. a mark showing a post office) or a map symbol.

Figure 5:
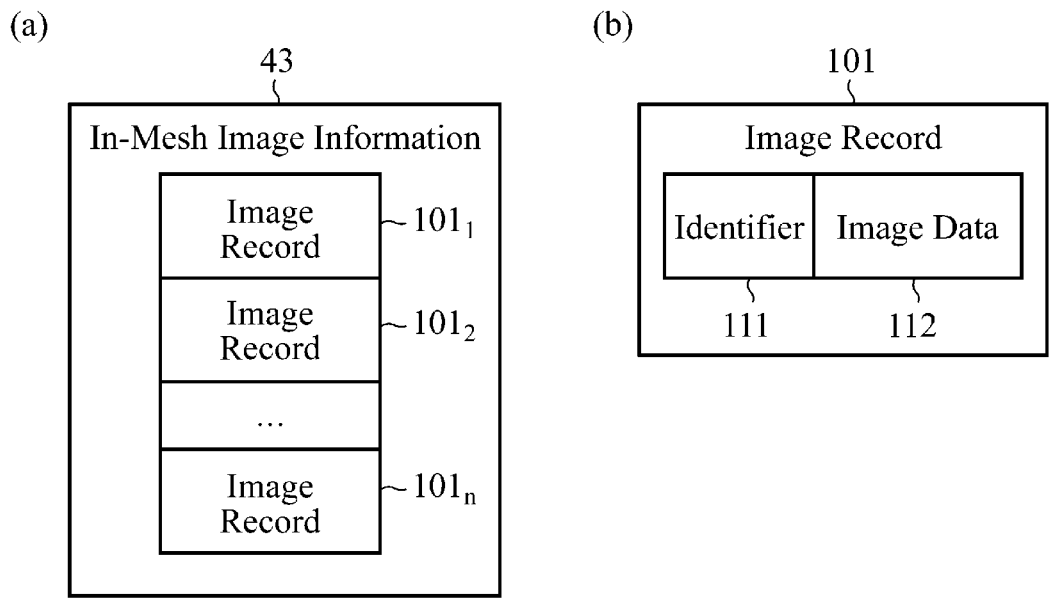
FIG. 5 is a view showing the detailed data structure of in-mesh image information shown in FIG. 3.

FIG. 5 shows the data structure of the in-mesh image information 43. The in-mesh image information 43 is comprised of a set of image records $101_1, 101_2, \ldots,$ and $101_n$, as shown in FIG. 5(a). Each of the image records $101_1, 101_2, \ldots,$ and $101_n$ (each image record is representedly designated by a numeral reference "101" from here on) holds an identifier ill for specifying image data uniquely and the image data 112, as shown in FIG. 5(b). The image data 112 can be formed using a general format, e.g. a bitmap format. As each image data 112 stored in the in-mesh image information 43, there can be image data having a low use frequency in the map display function, e.g. image data used in a case of producing a map display of an image of a specific facility (Tokyo Disneyland (registered trademark), Tokyo Tower, or the like).

Figure 6:
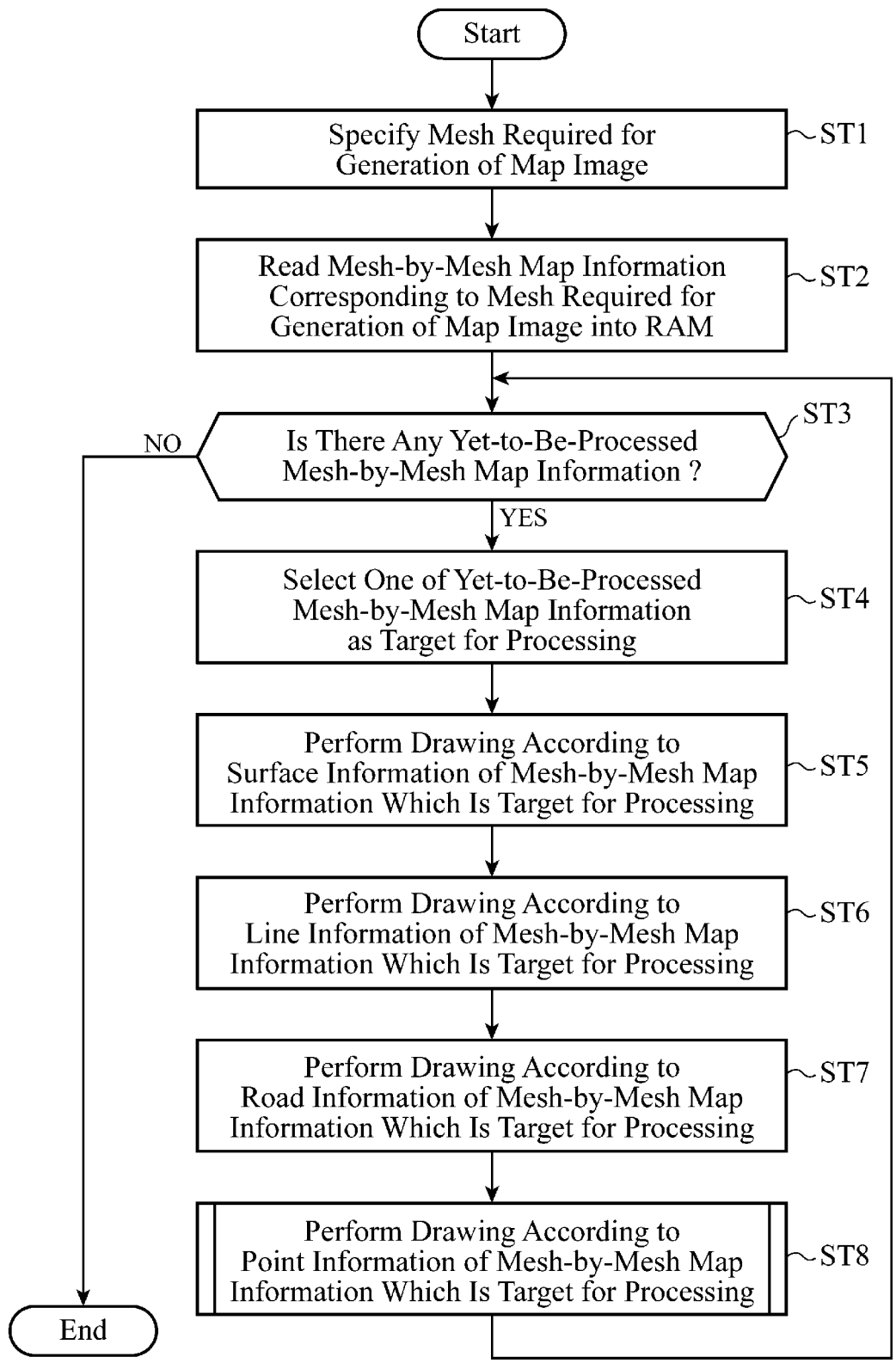
FIG. 6 is a flow chart showing the operation of the map information processor in accordance with Embodiment 1 of the present invention, focusing on a map image generating process.
Figure 7:
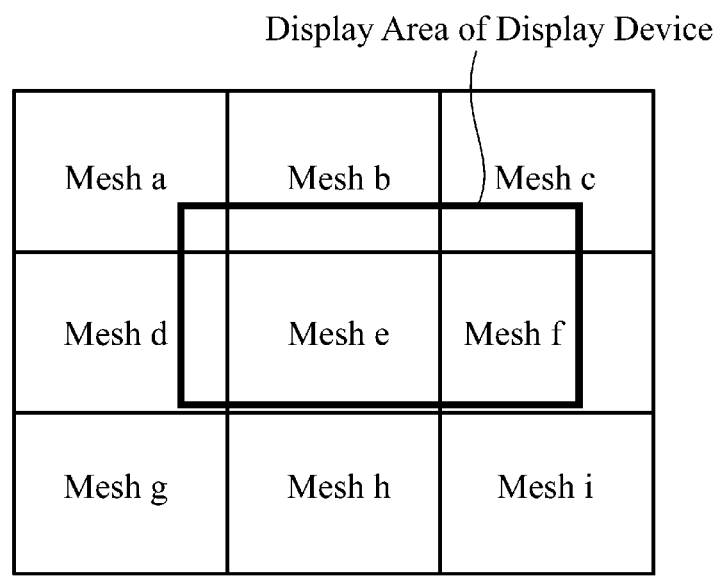
FIG. 7 is a view for explaining a process of specifying a mesh which is carried out in the map image generating process by the map information processor in accordance with Embodiment 1 of the present invention.

Next, the operation of the map information processor in accordance with Embodiment 1 of the present invention configured as mentioned above will be explained with reference to a flow chart shown in FIG. 6 and an explanatory drawing shown in FIG. 7, focusing on a map image generating process for implementing the map display function.

When the map image generating process is started, meshes required for generation of a map image are specified first (step ST1). The navigation processing unit 15 selects meshes for an area displayed in a display area of the display device 5 to specify the meshes. For example, in a case in which an area shown by a thick frame of FIG. 7 is the display area of the display device 5, meshes a, b, c, d, e, and f are specified as the required meshes.

Next, pieces of mesh-by-mesh map information 31 respectively corresponding to the meshes specified in step ST1 are read into the RAM 14 (step ST2). More specifically, the navigation processing unit 15 reads the pieces of mesh-by-mesh map information 31 respectively corresponding to the meshes specified in step ST1 via the control unit 17 from the map display information 21 of the map information stored in the HDD 13, and stores the pieces of mesh-by-mesh map information in the RAM 14.

Next, in order to draw a map image corresponding to all the pieces of mesh-by-mesh map information 31 read in step ST2, whether or not there is one or more yet-to-be-processed pieces of mesh-by-mesh map information 31 is checked to see (step ST3). When it is judged in this step ST3 that there is no yet-to-be-processed piece of mesh-by-mesh map information 31, the map image generating process is ended.

In contrast, when it is judged in step ST3 that there is one or more yet-to-be-processed pieces of mesh-by-mesh map information 31, one yet-to-be-processed piece of mesh-by-mesh map information is selected as the target for processing from the one or more yet-to-be-processed pieces of mesh-by-mesh map information 31 (step ST4). More specifically, the navigation processing unit 15 selects one of the one or more yet-to-be-processed pieces of mesh-by-mesh map information 31 stored in the RAM 14 as the target for processing via the control unit 17. When the navigation processing unit 15 accesses the RAM 14, the navigation processing unit certainly accesses the RAM via the control unit 17. Therefore, the following description "via the control unit 17" will be omitted hereafter in such an explanation.

Drawing according to the surface information 51 of the mesh-by-mesh map information 31 selected in step ST4 which is the target for processing is then carried out (step ST5). More specifically, the navigation processing unit 15 reads the surface information 51 of the yet-to-be-processed piece of mesh-by-mesh map information 31 selected in step ST4 from the RAM 14, and performs drawing of a surface such as woods or a lake according to this read surface information 51.

Drawing according to the line information 52 of the mesh-by-mesh map information 31 selected in step ST4 which is the target for processing is then carried out (step ST6). More specifically, the navigation processing unit 15 reads the line information 52 of the yet-to-be-processed piece of mesh-by-mesh map information 31 selected in step ST4 from the RAM 14, and performs drawing of a line, such as a river or an administrative boundary line, according to this read line information 52.

Drawing according to the road information 41 of the mesh-by-mesh map information 31 selected in step ST4 which is the target for processing is then carried out (step ST7). More specifically, the navigation processing unit 15 reads the road information 41 of the yet-to-be-processed piece of mesh-by-mesh map information 31 selected in step ST4 from the RAM 14, and performs drawing of roads according to this read road information 41.

Drawing according to the point information 53 of the mesh-by-mesh map information 31 selected in step ST4 which is the target for processing is then carried out (step ST8). More specifically, the navigation processing unit 15 reads the point information 53 of the yet-to-be-processed piece of mesh-by-mesh map information 31 selected in step ST4 from the RAM 14, and performs drawing based on one-point type data, such as a facility mark or a map symbol, according to this read point information 53. The process carried out in this step ST8 will be further explained in detail. After that, the sequence returns to step ST3 and the above-mentioned processes are repeated.

Figure 8:
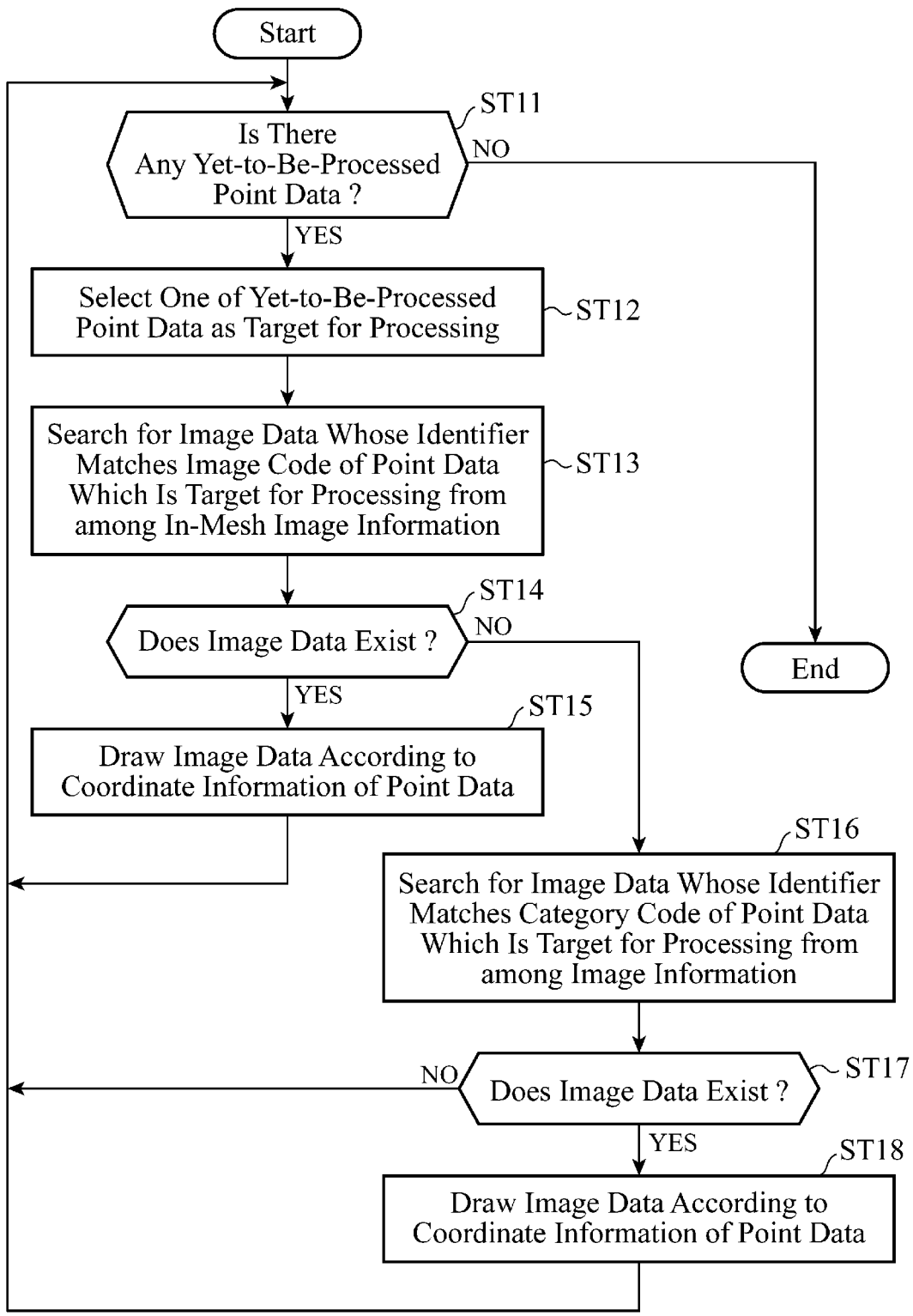
FIG. 8 is a flowchart showing the details of a process of drawing point information which is carried out in the map image generating process by the map information processor in accordance with Embodiment 1 of the present invention.

FIG. 8 is a flow chart showing the details of the process of drawing the point information performed in step ST8. In this process of drawing the point information, it is checked to see first whether or not one or more yet-to-be-processed point data 61 are included in the point information 53 (step ST11). More specifically, the navigation processing unit 15 refers to the contents of the RAM 14 to check to see whether one or more yet-to-be-processed point data 61 are included in the point information 53 of the yet-to-be-processed mesh-by-mesh map information 31 selected in step ST4. When it is judged in this step ST11 that no yet-to-be-processed point data 61 are included in the point information 53, the process of drawing the point information is ended.

In contrast, when it is judged in step ST11 that one or more yet-to-be-processed point data 61 are included in the point information 53, one of the one or more yet-to-be-processed point data 61 is then selected as the target for processing (step ST12). More specifically, the navigation processing unit 15 selects, as the target for processing, one of the one or more the yet-to-be-processed point data 61 included in the point information 53 of the yet-to-be-processed mesh-by-mesh map information 31 stored in the RAM 14.

Image data 112 whose identifier 111 matches the image code 73 of the point data 61 selected in step ST12, which is the target for processing, is then searched from among the in-mesh image information 43 (step ST13). More specifically, the navigation processing unit 15 searches for image data 112 whose identifier 111 of an image record 100 included in the in-mesh image information 43 of the yet-to-be-processed mesh-by-mesh map information 31 stored in the RAM 14 matches the image code 73 of the yet-to-be-processed point data 61 included in the point information 53 of the mesh-by-mesh map information 31.

It is then checked to see whether or not the image data exists (step ST14). More specifically, the navigation processing unit 15 checks to see whether the image data 112 whose identifier 111 matches the image code 73 of the yet-to-be-processed point data 61 included in the point information 53 of the mesh-by-mesh map information 31 has been searched from among all the image records 100 included in the in-mesh image information 43 of the yet-to-be-processed mesh-by-mesh map information 31 stored in the RAM 14.

When it is judged in this step ST14 that the image data exists, the image data 112 is then drawn according to the coordinate information 71 of the point data 61 (step ST15). More specifically, the navigation processing unit 15 draws an image based on the image data 112, which has been searched from among the in-mesh image information 43 of the yet-to-be-processed mesh-by-mesh map information 31 stored in the RAM 14, at the position shown by the coordinate information 71 of the point data 61. After that, the sequence returns to step ST11 and the above-mentioned processes are repeated.

In contrast, when it is judged in step ST14 that the image data does not exist, image data 92 whose identifier 91 matches the category code 72 of the point data 61 selected in step ST12, which is the target for processing, is searched from among the image information 22 (step ST16). More specifically, the navigation processing unit 15 searches for image data 92 whose identifier 91 of an image record 81 of the image information 22 stored in the RAM 14 matches the category code 72 of the yet-to-be-processed point data 61 included in the point information 53 of the mesh-by-mesh map information 31.

It is then checked to see whether or not the image data exists (step ST17). More specifically, the navigation processing unit 15 checks to see whether or not the image data 92 whose identifier 91 matches the category code 72 of the yet-to-be-processed point data 61 included in the point information 53 of the mesh-by-mesh map information 31 has been searched from among all the image records 81 of the image information 22 stored in the RAM 14.

When it is judged in this step ST17 that the image data 92 does not exist, the sequence returns to step ST11 and the above-mentioned processes are repeated. In contrast, when it is judged in step ST17 that the image data 92 exists, the image data 92 is then drawn according to the coordinate information 71 of the point data 61 (step ST18). More specifically, the navigation processing unit 15 draws an image based on the image data 92, which has been searched from among the image information 22 stored in the RAM 14, at the position shown by the coordinate information 71 of the point data 61. After that, the sequence returns to step ST11 and the above-mentioned processes are repeated.

As previously explained, because the map information processor in accordance with Embodiment 1 of the present invention can generate a map image on the basis of image data included in in-mesh image information which is managed on a mesh-by-mesh basis, the map information processor does not have to read image data managed in the outside of meshes. Therefore, the map information processor can shorten the time required to perform a map image generating process. Furthermore, because the map information processor manages image data about a large number of types of image data about images having a low frequency of occurrence in a map within the meshes, and manages image data about a small number of types of image data about images having a high frequency of occurrence in a map in the outside of the meshes, the map information processor can shorten the time required to perform a map image generating process while suppressing the capacity of a memory for use in the map information processor.

At the time of startup of the car navigation device 7, the reading of the image data 92 included in each image record 81 of the image information 22 into the RAM 14 is completed in advance. As a result, because the operation of searching for image data 92 which is specified by an identifier 91 which matches the category code 72 of the point data 61 can be implemented with search through the RAM 14 for the image data, the searching operation can be carried out at a high speed.

The above-mentioned map information processor in accordance with Embodiment 1 is configured in such a way as to store image data 92 frequently used in the map display function as the image information 22, and, in the map image generating process, acquire and draw image data 92 from the image information 22 according to the category code 72. As an alternative, the above-mentioned map information processor can be configured in such a way as to store also image data frequently used in the map display function in the in-mesh image information 43, and, in the map image generating process, acquire and draw image data 92 from the in-mesh image information 43 according to the image code 73.

Furthermore, the map display information stored in the HDD 13 and included in the map information can be formed dividedly into plural pieces of map display information respectively configured in a plurality of layers according to display densities. In this case, map display information in each of the layers is comprised of a set of pieces of mesh-by-mesh map information.

Embodiment 2

A car navigation system to which a map information processor in accordance with Embodiment 2 of the present invention is applied has the same configuration as that of the car navigation system to which the map information processor in accordance with Embodiment 1 shown in FIG. 1 is applied, except for the data structure of map information stored in an HDD 13 of a car navigation device 7.

Map information for use in the map information processor in accordance with this Embodiment 2 is the same as that for use in the map information processor in accordance with above-mentioned Embodiment 1, with the exception that point data 61a is provided instead of point data 61. Hereafter, the difference between this Embodiment and Embodiment 1 will be explained mainly.

Figure 9:
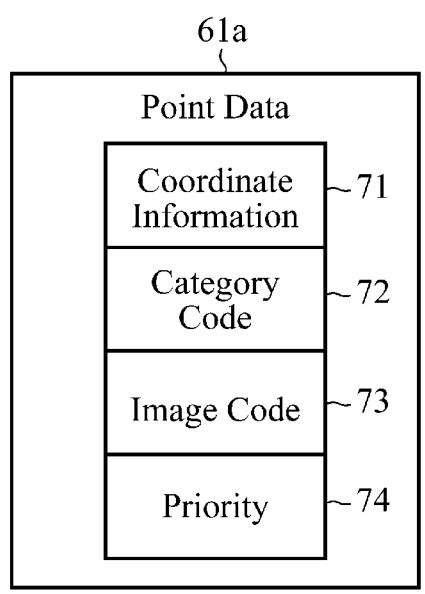
FIG. 9 is a view showing the structure of point data of map information for use in a map information processor in accordance with Embodiment 2 of the present invention.

FIG. 9 shows the configuration of each point data 61a for use in the map information processor in accordance with Embodiment 2. Each point data 61a is configured in such a way as to include a priority 74 in addition to the elements of each point data 61 as shown in FIG. 3(c). It is assumed that the larger value the priority 74 has the higher priority is assigned to each point data.

Next, the operation of the map information processor in accordance with Embodiment 2 of the present invention configured as mentioned above will be explained. A map image generating process carried out by the map information processor in accordance with this Embodiment 2 is the same as that carried out by the map information processor in accordance with Embodiment 1, except for a process of drawing point information which is performed in step ST8 of the flow chart shown in FIG. 6. Hereafter, only a part different from that shown in Embodiment 1 will be explained.

Figure 10:
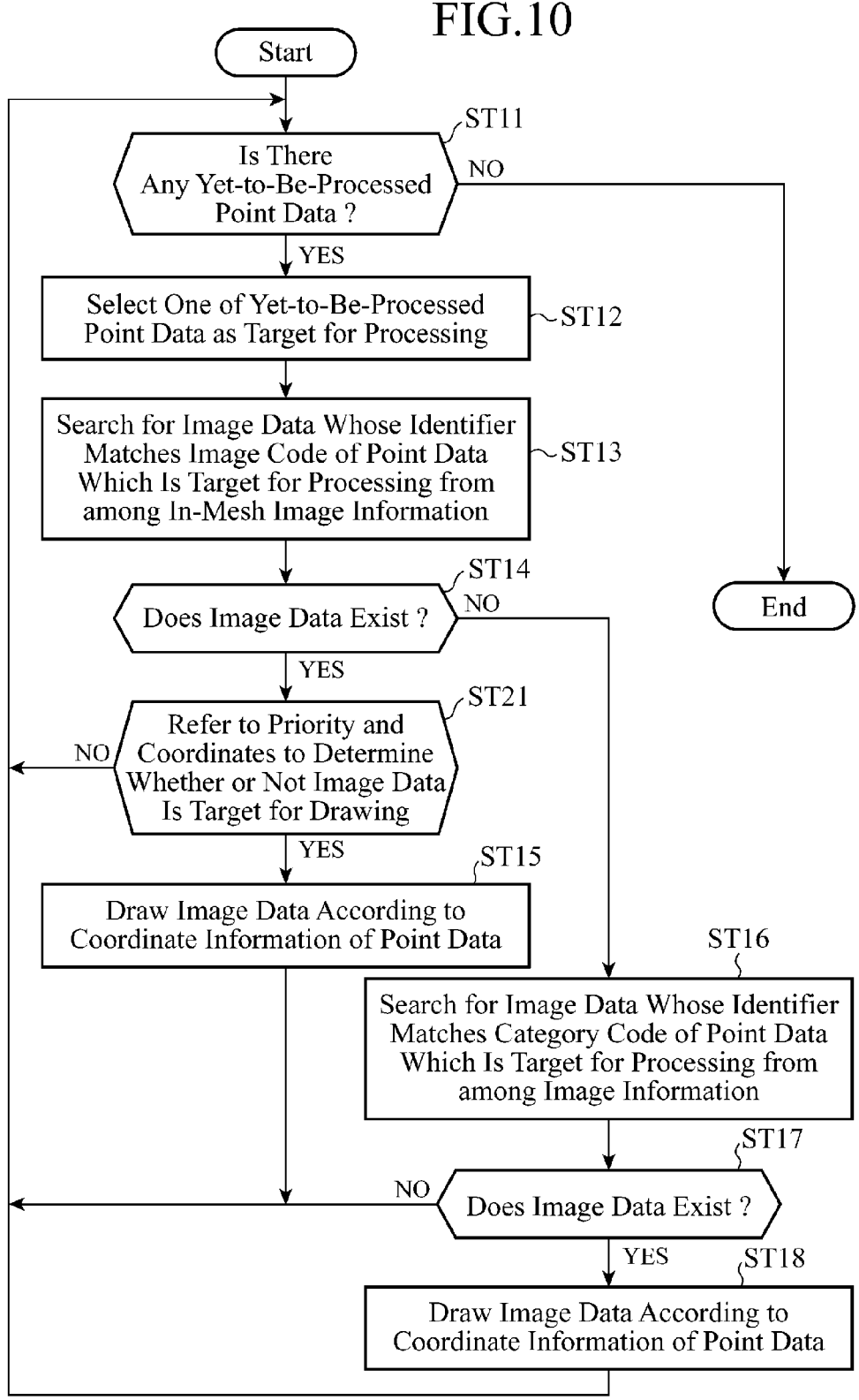
FIG. 10 is a flow chart showing the details of a process of drawing point information which is carried out by the map information processor in accordance with Embodiment 2 of the present invention.

FIG. 10 is a flow chart showing the details of the process of drawing point information performed in step ST8. In this process of drawing point information, step ST21 is added between step ST14 and step ST15 of the process of drawing point information shown in the flow chart of FIG. 8, which is carried out by the map information processor in accordance with Embodiment 1. Hereafter, the steps in which the same process as that of drawing point information in the map information processor in accordance with Embodiment 1 is carried out are designated by the same reference characters as those used in FIG. 8, and the explanation of the steps will be simplified.

In the process of drawing point information, it is checked to see first whether or not one or more yet-to-be-processed point data 61 are included in the point information 53 (step ST11). When it is judged in this step ST11 that no yet-to-be-processed point data 61 is included in the point information 53, the process of drawing point information is ended. In contrast, when it is judged that one or more yet-to-be-processed point data 61 are included in the point information 53, one of the one or more yet-to-be-processed point data 61 is then selected as the target for processing (step ST12). Image data 112 whose identifier 111 matches the image code 73 of the point data 61 selected in step ST12, which is the target for processing, is then searched from among the in-mesh image information 43 (step ST13).

It is then checked to see whether or not the image data exists (step ST14). When it is judged in this step ST14 that the image data exists, it is then checked to see with reference to the priority 74 and the coordinate information 71 whether or not the image data is the target for drawing (step ST21). More specifically, a navigation processing unit 15 determines whether or not the image data is the target for drawing according to the coordinate information 71 and the priority 74 of the yet-to-be-processed point data 61 which is included in the point information 53 of the mesh-by-mesh map information 31 by examining all the image records 100 included in the in-mesh image information 43 of the yet-to-be-processed mesh-by-mesh map information 31 stored in the RAM 14.

In this determination, a priority determination table as shown in FIG. 11 is used. The priority determination table can be stored and placed in the HDD 13. As an alternative, a determination rule can be incorporated into a program for defining the operation of the navigation processing unit 15 in advance. In this step ST21, from the coordinates of the center of a display area of a display device 5, and the coordinate information 71 of the point data 61 which is the target for processing, the distance between them is determined, whether or the image data is the target for drawing is determined from the distance and the graphical scale of a map image to be generated.

For example, in a case in which the graphical scale of a map drawn by the navigation processing unit 15 is 500 meters, it is determined that the image data is the target for drawing when the priority 74 of the point data 61 which is the target for determination is "1" regardless of the distance, when the priority 74 of the point data 61 is "2" and the distance is less than 5 km, and when the priority 74 of the point data 61 is "3" and the distance is less than 2 km, whereas it is determined that the image data is not the target for drawing when the priority 74 of the point data 61 is "4". When it is judged in this step ST21 that the image data is not the target for drawing, the sequence returns to step ST11 and the above-mentioned processes are repeated.

In contrast, when it is judged in step ST21 that the image data 112 is the target for drawing, the image data 112 is then drawn according to the coordinate information 71 of the point data 61 (step ST15). After that, the sequence returns to step ST11 and the above-mentioned processes are repeated. In contrast, when it is judged in step ST14 that the image data does not exist, image data 92 whose identifier 91 matches the category code 72 of the point data 61 selected in step ST12, which is the target for processing, is searched from among the image information 22 (step ST16).

It is then checked to see whether or not the image data exists (step ST17). When it is judged in this step ST17 that the image data does not exist, the sequence returns to step ST11 and the above-mentioned processes are repeated. In contrast, when it is judged in step ST17 that the image data 92 exists, the image data 92 is then drawn according to the coordinate information 71 of the point data 61 (step ST18). After that, the sequence returns to step ST11 and the above-mentioned processes are repeated.

As explained above, because the map information processor in accordance with Embodiment 2 of the present invention is configured in such a way as to control whether to enable or disable drawing of an object according to its priority, the map information processor can prevent reduction in the user's visibility on the map due to display of various images on the map image.

The map information processor in accordance with this Embodiment 2 is configured in such a way as to, when drawing image data 112 corresponding to the image code 73 of the point data 61 which is the target for processing, determine whether or not the image data is the target for drawing according to the priority determination table. As an alternative, the map information processor can be configured in such a way as to carry out this determination immediately after selecting the point data 61 which is the target for processing.

Embodiment 3

A car navigation system to which a map information processor in accordance with Embodiment 3 of the present invention is applied has the same configuration as that of the car navigation system to which the map information processor in accordance with Embodiment 1 shown in FIG. 1 is applied, except for the data structure of map information stored in an HDD 13 of a car navigation device 7.

Map information for use in the map information processor in accordance with this Embodiment 3 is the same as that for use in the map information processor in accordance with above-mentioned Embodiment 1, with the exception that the map information for use in the map information processor in accordance with this Embodiment 3 is formed dividedly into plural pieces of map information respectively configured in a plurality of layers according to display densities. Hereafter, the difference between this Embodiment and Embodiment 1 will be explained mainly.

FIG. 12 shows the data structure of map display information 21 for use in the map information processor in accordance with Embodiment 3. The map display information 21 is comprised of a multiple-layered set of pieces of map display information $23_1, 23_2, \ldots,$ and $23_n$ respectively corresponding to the plurality of layers divided according to display densities. Each of the pieces of map display information $23_1, 23_2, \ldots,$ and $23_n$ in the multiple-layered set (each map display information is representedly designated by a numeral reference "23" from here on) is comprised of a set of pieces of mesh-by-mesh map information $31_1, 31_2, \ldots,$ and $31_n$ managed on a mesh-by-mesh basis, as in the case of above-mentioned Embodiments 1 and 2.

Next, the operation of the map information processor in accordance with Embodiment 3 of the present invention configured as mentioned above will be explained. A map image generating process carried out by the map information processor in accordance with this Embodiment 3 is the same as that carried out by the map information processor in accordance with Embodiment 1, except for a process of drawing point information which is performed in step ST8 of the flow chart shown in FIG. 6. Hereafter, only a part different from that shown in Embodiment 1 will be explained.

Figure 13:
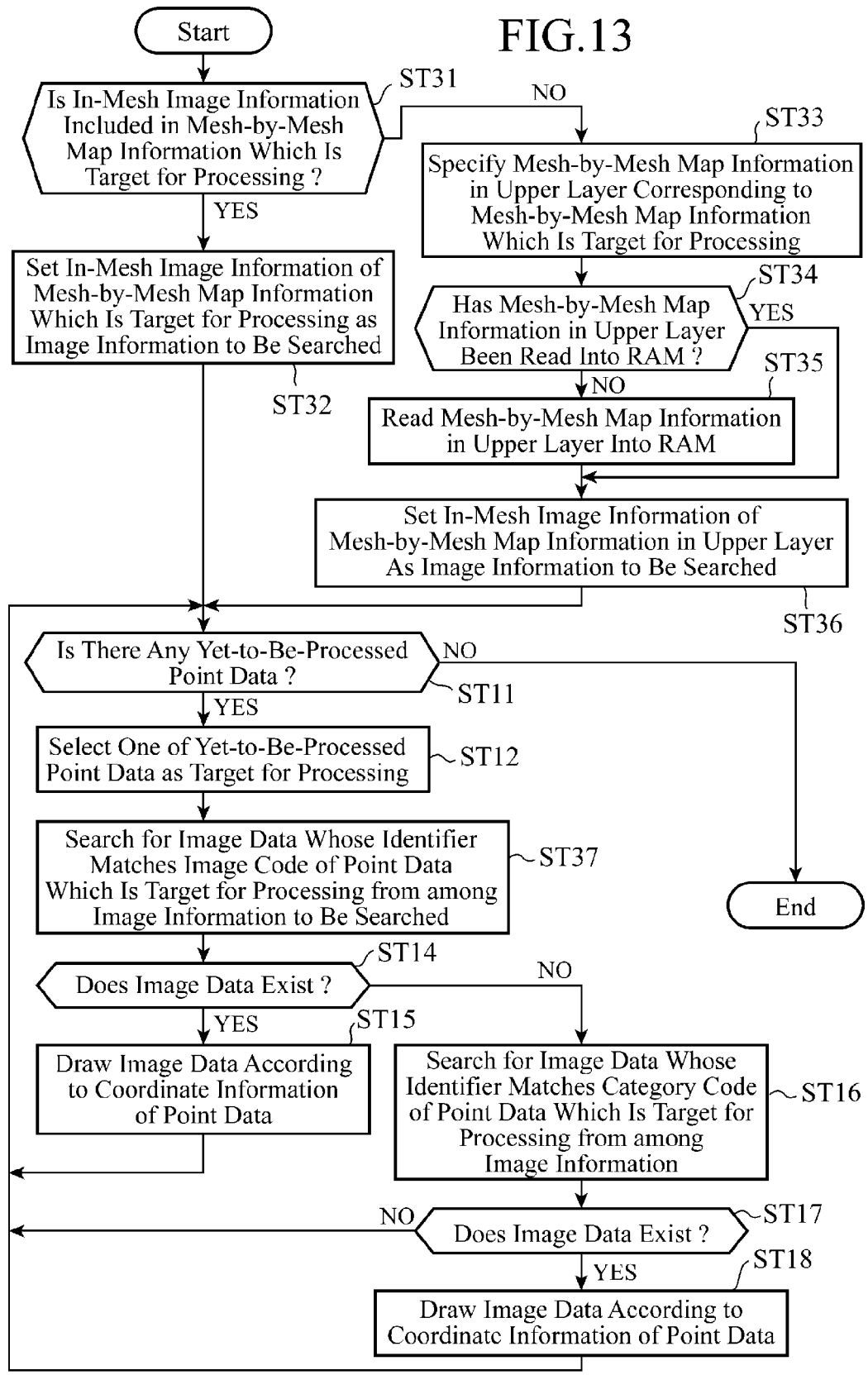
FIG. 13 is a flow chart showing the details of a process of drawing point information which is carried out in a map image generating process by the map information processor in accordance with Embodiment 3 of the present invention.

FIG. 13 is a flow chart showing the details of the process of drawing point information performed in step ST8. In this process of drawing point information, steps ST31 to ST36 are added to the process of drawing point information shown in the flow chart of FIG. 8, which is carried out by the map information processor in accordance with Embodiment 1, and step ST13 is replaced by step ST37. Hereafter, the steps in which the same process as that of drawing point information in the map information processor in accordance with Embodiment 1 is carried out are designated by the same reference characters as those used in FIG. 8, and the explanation of the steps will be simplified.

In the process of drawing point information, it is checked to see first whether in-mesh image information 43 exists in the mesh-by-mesh map information 31 which is the target for processing (step ST31). More specifically, the navigation processing unit 15 refers to the contents of the RAM 14 to check to see whether in-mesh image information 43 exists in the yet-to-be-processed mesh-by-mesh map information 31 selected in step ST4.

When it is judged in this step ST31 that in-mesh image information 43 exists in the mesh-by-mesh map information 31 which is the target for processing, the in-mesh image information 43 of the mesh-by-mesh map information 31 which is the target for processing is then set as image information to be searched (step ST32). More specifically, when judging that in-mesh image information 43 exists in the mesh-by-mesh map information 31, the navigation processing unit 15 sets the in-mesh image information 43 as image information to be searched. After that, the sequence advances to step ST11.

In contrast, when it is judged in step ST31 that no in-mesh image information 43 exists in the mesh-by-mesh map information 31 which is the target for processing, mesh-by-mesh map information in an upper layer corresponding to the mesh-by-mesh map information 31 which is the target for processing is specified (step ST33). More specifically, the navigation processing unit 15 specifies mesh-by-mesh map information 31 included in the map display information 23 in an upper layer above the layer in which the mesh-by-mesh map information 31 which is being currently set as the target for processing is located. This process of specifying the mesh-by-mesh map information 31 in the upper layer will be explained below in detail.

It is then checked to see whether or not the mesh-by-mesh map information 31 in the upper layer specified in step ST33 has been read into the RAM 14 (step ST34). More specifically, the navigation processing unit 15 checks to see whether or not the mesh-by-mesh map information 31 in the upper layer is stored in the RAM 14. When it is judged in this step ST34 that the mesh-by-mesh map information 31 in the upper layer has not been read into the RAM 14, the mesh-by-mesh map information 31 in the upper layer is read into the RAM 14 (step ST35). More specifically, the navigation processing unit 15 reads the mesh-by-mesh map information 31 in the upper layer from the HDD 13, and stores the mesh-by-mesh map information in the RAM 14. In contrast, when it is judged in step ST34 that the mesh-by-mesh map information 31 in the upper layer has been read into the RAM 14, the process of step ST35 is skipped.

The in-mesh image information 43 of the mesh-by-mesh map information 31 in the upper layer is then set as the image information to be searched (step ST36). More specifically, the navigation processing unit 15 sets the in-mesh image information 43 of the mesh-by-mesh map information 31 in the upper layer stored in the RAM 14 as the image information to be searched. After that, the sequence advances to step ST11.

It is checked to see in step ST11 whether or not one or more yet-to-be-processed point data 61 are included in the point information 53. When it is judged in this step ST11 that there is no yet-to-be-processed point data 61, the process of drawing the point information is ended. In contrast, when it is judged that one or more yet-to-be-processed point data 61 are included in the point information, one of the one or more yet-to-be-processed point data 61 is then selected as the target for processing (step ST12).

Image data whose identifier 111 matches the image code 73 of one point data 61 which is the target for processing is then searched from among the image information to be searched (step ST37). More specifically, the navigation processing unit 15 searches through the image information to be searched stored in the RAM 14 for image data 112 having an identifier 111 which matches the image code 73 of one yet-to-be-processed point data 61 included in the point information 53 of the mesh-by-mesh map information 31.

It is then checked to see whether or not the image data exists (step ST14). When it is judged in this step ST14 that the image data 112 exists, the image data 112 is then drawn according to the coordinate information 71 of the point data 61 (step ST15). In contrast, when it is judged in step ST14 that the image data does not exist, image data 92 whose identifier 91 matches the category code 72 of the point data 61 selected in step ST12, which is the target for processing, is searched from among the image information 22 (step ST16).

It is then checked to see whether or not the image data exists (step ST17). When it is judged in this step ST17 that the image data does not exist, the sequence returns to step ST11 and the above-mentioned processes are repeated. In contrast, when it is judged in step ST17 that the image data 92 exists, the image data 92 is then drawn according to the coordinate information 71 of the point data 61 (step ST18). After that, the sequence returns to step ST11 and the above-mentioned processes are repeated.

Figure 14:
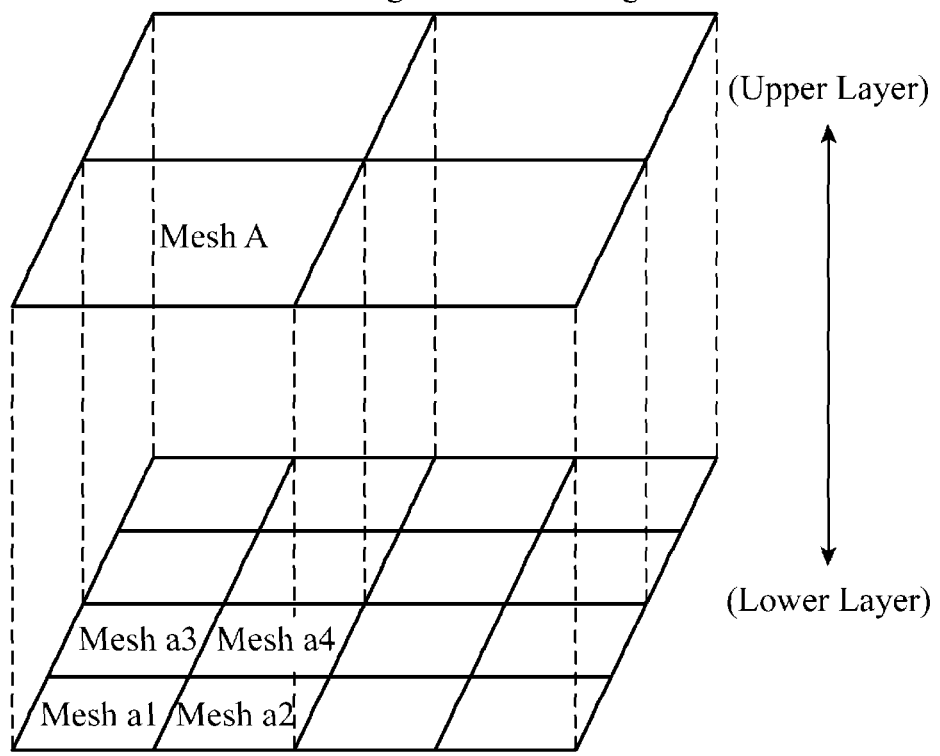
FIG. 14 is a view for explaining a process of specifying mesh-by-mesh map information in an upper layer which is carried out by the map information processor in accordance with Embodiment 3 of the present invention.

Next, the process of specifying the mesh-by-mesh map information in the upper layer corresponding to the mesh-by-mesh map information which is the target for processing, which is carried out in step ST33, will be explained with reference to FIG. 14. In the layered pieces of map display information arranged in a hierarchical format, map display information in a lower layer has finer meshes than those of map display information in an upper layer. This is because mesh-by-mesh map information in a lower layer is stored more densely than that in an upper layer. In this example shown in FIG. 14, meshes 11, 12, 13 and 14 in a lower layer correspond to a mesh 21 in an upper layer.

As previously explained, because the map information processor in accordance with Embodiment 3 of the present invention is configured in such a way as to include layered pieces of map display information arranged in a hierarchical format, the map information processor provides the same advantages as those provided by the map information processor in accordance with above-mentioned Embodiment 1 or Embodiment 2 while suppressing the volume of data stored in the HDD 13.

The map information processor in accordance with Embodiment 3 is configured in such a way as to acquire image data 112 corresponding to an image code 73 from either the in-mesh image information 43 included in the mesh-by-mesh map information 31 which is the target for processing or the in-mesh image information 43 included in the mesh-by-mesh map information which is located in an upper layer immediately above the mesh-by-mesh map information 31 which is the target for processing and which corresponds to the mesh-by-mesh map information 31. As an alternative, the map information processor in accordance with Embodiment 3 can be configured in such a way as to acquire image data 112 corresponding to an image code from the in-mesh image information 43 included in the mesh-by-mesh map information in an upper layer which is located two or more layers above the mesh-by-mesh map information 31 which is the target for processing and which corresponds to the mesh-by-mesh map information 31.

The map information processor in accordance with Embodiment 3 can arrange image data managed with the in-mesh image information 43 stored in the HDD13 in order based on layers used, and the navigation processing unit 15 can change image data 112 used for an map image which is generated on the basis of in-mesh image information 43 in a lower layer in such a way as to continuously acquire the image data 112 in the order in which the image data 112 are arranged when acquiring in-mesh image information in an upper layer corresponding to the in-mesh image information 43 in a lower layer.

FIG. 15 shows the data structure of in-mesh image information 43 for used in a map information processor in accordance with a variant of this Embodiment 3. The in-mesh image information 43 is comprised of a set of image records $101_1, 101_2, \ldots,$ and $101_n$ arranged in order based on layers used, and layer-by-layer image management information 102, as shown in FIG. 15(*a*). The layer-by-layer image management information 102 is comprised of a row of layer-by-layer image management records $103_1, 103_3, \ldots,$ and $103_n$ (each layer-by-layer image management record is representedly designated by a numeral reference "103" from here on), shown in FIG. 15(*b*). As shown in FIG. 15(*c*), each layer-by-layer image management record is comprised of a starting record number 104 and a use record count 105, and they are used to specify an image record used in each layer.

In a case in which the in-mesh image information 43 having such a data structure as mentioned is used in order to generate a map image based on layer-by-layer map display information 23 having three layers, three layer-by-layer image management records are generated in the layer-by-layer image management information 102. When the starting record number is "1" and the use record count is "2" in the first layer-by-layer image management record, it is assumed that the image record which is the second one counted from the first image record, i.e. the second image record is used. When the starting record number is "1" and the use record count is "5" in the second layer-by-layer image management record, it is assumed that the image record which is the fifth one counted from the first image record, i.e. the fifth image record is used.

The map information processor in accordance with the variant of this Embodiment 3 can shorten the time required to perform a map image generating process. The map information processor in accordance with the variant of this Embodiment 3 can be alternatively configured in such a way as to, instead of specifying an image record to be are used for each of layers, specify an image record to be used according to a map display scale.

INDUSTRIAL APPLICABILITY

As mentioned above, the map information processor in accordance with the present invention is configured in such a way as to generate a map image on the basis of image data included in in-mesh image information managed on a mesh-by-mesh basis in order to shorten the time required to perform a map image generating process, and the data structure of map information in accordance with the present invention is configured in such a way that a map image is generated on the basis of image data included in in-mesh image information managed on a mesh-by-mesh basis in order to shorten the time required for the map information processor to perform a map image generating process. Therefore, generation of a map image can be implemented in a short time, and the map information processor and the data structure of map information in accordance with the present invention are suitable for use in a car navigation device and so on.

The invention claimed is:

1. A map information processor comprising:
a map information storage unit for storing map display information including a set of mesh-by-mesh map information elements managed on a mesh-by-mesh basis, each mesh-by-mesh map information element including respective sub-elements storing road information, background information for a corresponding mesh, and in-mesh image information for a corresponding mesh, the map information storage unit further storing image information which is managed outside of the map display information;
an image processing unit for generating a map image on a basis of image data included in each road information sub-element, background information sub-element, and in-mesh image information sub-element included in the mesh-by-mesh map information read from said map information storage unit, the image processing unit generating the map on further basis of image data included in the image information which is managed outside of the map display information and is read from the map information storage unit; and
a display unit for displaying the map image generated by said image processing unit,
wherein the image information which is managed outside of the map display information is stored in the map storage unit in a data structure that is not arranged on a mesh-by-mesh basis.

2. The map information processor according to claim 1, wherein the map information stored in the map information storage unit is divided into a plurality of pieces of map information hierarchically organized, and the image processing unit acquires the image data for use in the map image which the image processing unit generates on a basis of mesh-by-mesh map information in a lower layer from in-mesh image information included in mesh-by-mesh map information in an upper layer corresponding to said mesh-by-mesh map information in the lower layer.

3. The map information processor according to claim 2, wherein the image data managed with the in-mesh image information stored in the map information storage unit are arranged in order based on layers in which the image data are used, and the image processing unit continuously acquires the image data for use in the map image which the image processing unit generates on a basis of the mesh-by-mesh map information in a lower layer in order in which the image data are arranged when acquiring the in-view image information included in mesh-by-mesh map information in an upper layer corresponding to the mesh-by-mesh image information in a lower layer.

4. The map information processor according to claim 1, wherein the point information indicates whether image data of each map symbol and/or facility mark is stored within an in-mesh image information sub-element of the mesh-by-mesh map information element or within image information data managed outside of the set of mesh-by-mesh map information elements.

5. The map information processor according to claim 1, wherein the background information sub-element of each mesh-by-mesh map information element stores point information for each map symbol and/or facility mark associated with the corresponding mesh.

6. The map information processor according to claim 5, wherein
said point information includes coordinate information for determining a position within the corresponding mesh at which each map symbol and/or facility mark is placed, an image code for specifying image data for each map symbol and/or facility mark included in a corresponding in-mesh information sub-element, and a category code for specifying image data for each map symbol and/or facility mark included in the image information data managed outside of the set of mesh-by-mesh image information elements, and
the image processing unit acquires the image data for each map symbol and/or facility mark, on the basis of the image code, from the appropriate one of the in-mesh image information sub-element and the image information managed outside of the set of mesh-by-mesh map information elements.

7. The map information processor according to claim 6, wherein the point information further includes priority information for determining a priority for displaying the image shown by the image data for each map symbol and/or facility mark, and the image processing unit determines an image to be included in the map image generated thereby according to said priority information.

8. The map information processor according to claim 7, wherein the image processing unit acquires the image data corresponding to the image code according to the priority information, and generates the map image including the image shown by this acquired image data.

9. The map information processor according to claim 1, wherein the in-mesh image information and the image information which is managed outside of the map display information contain image data in a bitmap format.

10. The map information processor according to claim 1, wherein a data structure in which the image information which is managed outside of the map display information is stored contains a set of image records, each containing image data in a bitmap format and a corresponding identifier,
wherein a location in the map image in which one of the image data is to be displayed is determinable by a code in the background information sub-element of one of the mesh-by-mesh information elements which links the identifier corresponding to the one of the image data to the mesh corresponding to the one of the mesh-by-mesh information elements.

11. A non-transitory computer readable medium on which is stored map information comprising:
map display information comprised of a set of mesh-by-mesh map information elements managed on a mesh-by-mesh basis, each mesh-by-mesh map information element including respective sub-elements storing road information, background information, and in-mesh image information for a corresponding mesh; and
image information which is managed outside of the map display information,
wherein the image information which is managed outside of the map display information is stored in a data structure that is not arranged on a mesh-by-mesh basis.

12. The computer readable medium on which is stored the map information according to claim 11, wherein the map information is divided into a plurality of pieces of map information hierarchically organized in such a way that image data corresponding to a map image based on mesh-by-mesh map information in a lower layer is included in in-mesh image information included in mesh-by-mesh map information in an upper layer corresponding to said mesh-by-mesh map information in a lower layer.

13. The computer readable medium on which is stored the map information according to claim 12, wherein image data managed with the in-mesh image information are arranged in order based on layers in which the image data are used.

14. The non-transitory computer readable medium according to claim 11, wherein the point information indicates whether image data of each map symbol and/or facility mark is stored within an in-mesh image information sub-element of the mesh-by-mesh map information element or within image information data managed outside of the set of mesh-by-mesh map information elements.

15. The non-transitory computer readable medium according to claim 11, wherein the background information sub-element of each mesh-by-mesh map information element stores point information for each map symbol and/or facility mark associated with the corresponding mesh.

16. The computer readable medium on which is stored the map information according to claim 15, wherein said point information includes coordinate information for determining a position within the corresponding mesh at which each map symbol and/or facility mark is placed, an image code used for acquiring image data of each map symbol and/or facility mark included in a corresponding in-mesh image information sub-element, and a category code used for acquiring image data of each map symbol and/or facility mark included in the image information managed outside of the mesh-by-mesh map information elements.

17. The computer readable medium on which is stored the map information according to claim 16, wherein the point information further includes priority information for determining a priority for displaying the image shown by the image data for each map symbol and/or facility mark.

18. The non-transitory computer readable medium according to claim 11, wherein the in-mesh image information and the image information which is managed outside of the map display information contain image data in a bitmap format.

19. The non-transitory computer readable medium according to claim 11, wherein a data structure in which the image information which is managed outside of the map display information is stored contains a set of image records, each containing image data in a bitmap format and a corresponding identifier,
wherein a location in the map image in which one of the image data is to be displayed is determinable by a code in the background information sub-element of one of the mesh-by-mesh information elements which links the identifier corresponding to the one of the image data to the mesh corresponding to the one of the mesh-by-mesh information elements.

* * * * *